(12) United States Patent
Scheim et al.

(10) Patent No.: US 7,491,786 B2
(45) Date of Patent: Feb. 17, 2009

(54) CROSSLINKABLE COMPOSITIONS BASED ON ORGANOSILICON COMPOUNDS

(75) Inventors: Uwe Scheim, Coswig (DE); Marko Prasse, Riesa (DE)

(73) Assignee: Wacker Chemie AG, Munich (DE)

( * ) Notice: Subject to any disclaimer, the term of this patent is extended or adjusted under 35 U.S.C. 154(b) by 457 days.

(21) Appl. No.: 11/067,808

(22) Filed: Feb. 28, 2005

(65) Prior Publication Data

US 2005/0215747 A1 Sep. 29, 2005

(30) Foreign Application Priority Data

Mar. 23, 2004 (DE) .................. 10 2004 014 217

(51) Int. Cl.
C08G 77/26 (2006.01)
(52) U.S. Cl. ...................................... 528/38
(58) Field of Classification Search ................. 528/38
See application file for complete search history.

(56) References Cited

U.S. PATENT DOCUMENTS

| | | | | |
|---|---|---|---|---|
| 4,499,234 A * | 2/1985 | Pratt et al. | .................. | 524/783 |
| 4,537,944 A * | 8/1985 | Imai et al. | ..................... | 528/18 |
| 4,578,492 A * | 3/1986 | Pratt et al. | .................. | 556/407 |
| 4,659,798 A * | 4/1987 | Pohl et al. | ..................... | 528/33 |
| 4,760,123 A * | 7/1988 | Imai et al. | ..................... | 528/18 |
| 5,013,577 A * | 5/1991 | Wright et al. | ............... | 427/503 |
| 5,110,967 A * | 5/1992 | King et al. | .................. | 556/407 |
| 5,239,099 A * | 8/1993 | King et al. | .................. | 556/407 |
| 5,246,979 A * | 9/1993 | Lutz et al. | ..................... | 522/42 |
| 5,276,123 A * | 1/1994 | King et al. | ..................... | 528/17 |
| 5,371,164 A * | 12/1994 | Kobayashi et al. | ............ | 528/18 |
| 5,508,360 A * | 4/1996 | Cifuentes et al. | ............ | 525/477 |
| 5,688,840 A * | 11/1997 | Ono | ......................... | 523/209 |
| 5,777,144 A * | 7/1998 | Rubinsztajn et al. | ........ | 556/407 |
| 5,969,075 A * | 10/1999 | Inoue | ......................... | 528/15 |
| 6,534,615 B2 * | 3/2003 | Schafer et al. | ................ | 528/38 |
| 7,014,975 B2 * | 3/2006 | Barthel et al. | .......... | 430/123.51 |
| 7,074,875 B2 * | 7/2006 | Schindler et al. | ............. | 528/38 |
| 2002/0044491 A1* | 4/2002 | Brader et al. | ................. | 528/10 |
| 2003/0099895 A1 | 5/2003 | Barthel et al. | | |
| 2004/0210024 A1 | 10/2004 | Schafer et al. | | |
| 2004/0236056 A1* | 11/2004 | Schindler et al. | ............. | 528/38 |
| 2005/0085612 A1* | 4/2005 | Schafer et al. | ................ | 528/34 |
| 2005/0131088 A1 | 6/2005 | Stanjek et al. | | |
| 2006/0205861 A1* | 9/2006 | Gordon et al. | ............... | 524/506 |
| 2007/0104674 A1* | 5/2007 | Gordon et al. | ......... | 424/70.122 |
| 2007/0197757 A1* | 8/2007 | Schaefer et al. | ............... | 528/38 |

FOREIGN PATENT DOCUMENTS

| | | |
|---|---|---|
| DE | 42 34 846 A1 | 4/1994 |
| DE | 101 34 634 A1 | 2/2003 |
| DE | 101 37 855 A1 | 2/2003 |
| DE | 101 51 478 C1 | 3/2003 |
| DE | 102 12 658 A1 | 10/2003 |
| EP | 0 916 702 A1 | 5/1999 |
| EP | 1 141 132 | 10/2001 |
| WO | WO 00/37565 | 6/2000 |
| WO | WO2005014741 A1 * | 2/2005 |

OTHER PUBLICATIONS

EP 1 141 132 A1 is substituted by WO 00/37565, 2000.
US 2003/0099895 A1 is corresponding to DE 101 51 478 C1, 2003.
US 2004/0210024 A1 is corresponding to DE 101 37 855 A1, 2004.
US 2005/0131088 A1 is corresponding to DE 102 12 658 A1, 2005.
US 2004/0236056 A1 is corresponding to DE 101 34 634 A1, 2004.
Derwent Abstract corresponding to DE 42 34 846 A1, 2003.

* cited by examiner

*Primary Examiner*—Randy Gulakowski
*Assistant Examiner*—Robert Loewe
(74) *Attorney, Agent, or Firm*—Brooks Kushman P.C.

(57) ABSTRACT

The invention relates to crosslinkable compositions based on organosilicon compounds and having controllable modulus, to a process for their preparation and to their use, said compositions comprising (a) polymers of the formula $$X_nR_{3-n}Si\text{-}A\text{-}SiR_2\text{—}(CH_2)_3NHY \qquad (I)$$

(b) polymers of the structure $$X^1{}_kR^5{}_{3-k}Si\text{-}A^1\text{-}SiX^1{}_kR^5{}_{3-k} \qquad (II)$$

(c) optionally, silanes of the formula $$R^6{}_mSiX^2{}_{4-m} \qquad (III)$$

and/or partial hydrolyzates thereof, and
(d) optionally, silanes of the formula $$R^4{}_oSiR^7{}_pX^3{}_{4-o-p} \qquad (IV)$$

and/or partial hydrolyzates thereof,
where X, $X^1$ and $X^3$ are OH or a hydrolyzable group, R, $R^4$, $R^5$, and $R^7$ are hydrocarbyl groups, and A is a divalent linking group.

18 Claims, No Drawings

CROSSLINKABLE COMPOSITIONS BASED ON ORGANOSILICON COMPOUNDS

BACKGROUND OF THE INVENTION

1. Field of the Invention

The invention relates to crosslinkable compositions based on organosilicon compounds which have controllable modulus, to a process for their preparation and to their use.

2. Background Art

Single-component sealants which are storable under the exclusion of water and can be vulcanized to elastomers at room temperature on ingress of water are known. These products are used in large amounts, for example, in the construction industry. Such sealants are based on polymers which are terminated by silyl groups bearing reactive substituents such as OH groups or hydrolyzable groups such as alkoxy groups. It is possible, by virtue of the chain length of the polymers, to influence essential properties of these RTV1 mixtures. The modulus in particular, i.e. the stress value at 100% elongation of a cured test specimen, can be regulated by virtue of the chain length. For jointing sealants, for example, it is desired that the modulus is low, so that only minimum forces can act on the joint flanks. However, for economic and technical reasons, only a restricted range of polymer chain lengths is available for the production of sealant mixtures. Especially the long chain lengths required for very low-modulus sealants lead to very high viscosities of the polymers, so that such products can only be handled with difficulty. A further disadvantage of polymers having high viscosities is that the compositions produced therefrom can only be expelled from the containers with difficulty, since the sealant mixtures also exhibit high viscosity. In addition, it has been known for some time that the amount of unreactive plasticizers and active fillers can be used to vary the modulus. Here, though, since the compositions otherwise, for example in the case of too much plasticizer or too little active filler, become too nonviscous, which results in poor performance of the pasty sealant.

Furthermore, the use of polymers which contain a nonreactive group at some chain ends is known. For example, EP 1 141 132 A1 describes polymers which are obtained by reacting vinyl-terminated polydimethylsiloxanes with Si—H—containing crosslinkers, the crosslinkers being used in deficiency, so that unreactive vinyl groups remain in the polymer mixture. The vinyl-terminated polymers are, however, comparatively expensive, which makes the composition uneconomic for use in sealants. In addition, the preparation of the polymer cannot be integrated directly into sealant production, so that a separate step is needed. EP 916 702 A1 describes polymers which have some trimethylsilyl groups as unreactive end groups in the polymer. In this case too, the polymer has to be prepared separately before the actual sealant production.

SUMMARY OF THE INVENTION

It has now been surprisingly discovered that moisture crosslinkable elastomer compositions with controlled modulus and good viscosity characteristics can be produced by mixtures of organopolysiloxanes bearing both silicon bonded hydroxyl groups and/or hydrolyzable groups and aminoalkyl groups, with organopolysiloxanes bearing hydroxyl and/or hydrolyzable groups. The compositions are especially well suited for use as sealants.

DETAILED DESCRIPTION OF THE PREFERRED EMBODIMENT(S)

The invention provides crosslinkable compositions based on organosilicon compounds, comprising
(a) polymers of the formula $$X_n R_{3-n} Si\text{-}A\text{-}SiR_2\text{—}(CH_2)_3 NHY \quad (I)$$

where
n is 1 or 2,
X may be the same or different and is a hydroxyl radical or hydrolyzable radical,
R may be the same or different and is a monovalent, optionally substituted hydrocarbon radical,
Y is a hydrogen atom or a —$Si(CH_3)_2(CH_2)_3NH_2$ radical and
A is a divalent organic or organosilicon radical,
(b) polymers of the structure $$X^1_k R^5_{3-k} Si\text{-}A^1\text{-}SiX^1_k R^5_{3-k} \quad (II)$$

where
k may each be the same or different and is 1 or 2,
$R^5$ may be the same or different and has a definition specified for R,
$A^1$ has the definition specified for A radical and
$X^1$ may be the same or different and has the definition specified for X,
(c) optionally, silanes of the formula $$R^6_m SiX^2_{4-m} \quad (III)$$

and/or partial hydrolyzates thereof, where
m is 0 or 1,
$R^6$ may be the same or different and has the definition specified for R and
$X^2$ may be the same or different and has the definition specified for X, and
(d) optionally, silanes of the formula $$R^4_o SiR^7_p X^3_{4-o-p} \quad (IV)$$

and/or partial hydrolyzates thereof, where
p is 0 or 1,
o is 1 or 2,
$R^7$ may be the same or different and has the definition specified for R,
$X^3$ may be the same or different and has the definition specified for X and
$R^4$ may be the same or different and is monovalent, SiC-bonded hydrocarbon radical substituted by nitrogen, oxygen, sulfur and/or halogen, with the proviso that the sum of o+p is less than 3.

The hydrolyzable X groups may be any conventional hydrolyzable groups such as acetoxy, oximato and organyloxy groups. Examples of X radicals are the hydroxyl radical, acyloxy radicals such as the acetoxy radical, oximato radicals such as the methylethylketoximo radical, and organyloxy groups such as the methoxy radical, the ethoxy radical and alkoxyethoxy radicals such as the methoxyethoxy radical. The X radical is preferably an alkoxy and/or acyloxy radical, more preferably alkoxy radicals, in particular methoxy radicals.

The R and $R^5$ radicals are preferably each independently monovalent hydrocarbon radicals which have from 1 to 18 carbon atoms and are optionally substituted by halogen atoms, amino groups, ether groups, ester groups, epoxy groups, mercapto groups, cyano groups or (poly)glycol radicals, the latter being formed from oxyethylene and/or oxypropylene units, and are more preferably alkyl radicals having from 1 to 12 carbon atoms, in particular the methyl radical. Examples of R and $R^5$ radicals are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals such as the cyclopentyl, cyclohexyl, cycloheptyl and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals such as the o-, m-, p-tolyl radicals, xylyl radicals and ethylphenyl radicals; and aralkyl radicals such as the benzyl radical, and the α- and the β-phenylethyl radicals.

Examples of substituted R and $R^5$ radicals are the 3-aminopropyl, 3-(2-aminoethyl)aminopropyl, 3-cyclohexylaminopropyl, N-cyclohexylaminomethyl, 3-glycidoxypropyl and 3-methacryloyloxypropyl radicals.

The Y radical is preferably hydrogen.

Examples of A and $A^1$ radicals are, in each case independently, divalent organosilicon radicals such as polydiorganosiloxane radicals, and also divalent organic radicals such as polyether radicals, polyurethane radicals, polyurea radicals, polyalkylene radicals, for example polyisobutylene radicals, and polyacrylate radicals. The A and $A^1$ radicals are preferably, each independently, divalent polyether radicals or divalent polydiorganosiloxane radicals, more preferably divalent polydiorganosiloxane radicals, and in particular, divalent polydimethylsiloxanes.

Examples of polymers of the formula (I) are
$HO(Si(CH_3)_2O)_{30-1000}Si(CH_3)_2(CH_2)_3NH_2$,
$HO(Si(CH_3)_2O)_{30-10000}Si(CH_3)_2(CH_2)_3NHSi(CH_3)_2(CH_2)_3NH_2$,
$(CH_3O)_2(CH_3)SiO(Si(CH_3)_2O)_{30-1000}Si(CH_3)_2(CH_2)_3NH_2$,
$(CH_3O)_2(CH_3)SiO(Si(CH_3)_2O)_{30-1000}Si(CH_3)_2(CH_2)_3NHSi(CH_3)_2$—$(CH_2)_3NH_2$,
$(CH_3C(O)O)_2(CH_3)SiO(Si(CH_3)_2O)_{30-1000}Si(CH_3)_2(CH_2)_3NH_2$,
$(CH_3C(O)O)_2(CH_3)SiO(Si(CH_3)_2O)_{30-1000}Si(CH_3)_2(CH_2)_3NHSi$—$(CH_3)_2(CH_2)_3NH_2$,
$(CH_3O)_2(CH_3)SiO(Si(CH_3)_2O)_{0-100}(CH_2)_3O(CH_2CH(CH_3)O)$—$_{10-1000}(CH_2)_3O(Si(CH_3)_2O)_{0-100}Si(CH_3)_2(CH_2)_3NH_2$ and
$(CH_3O)_2(CH_3)SiO(Si(CH_3)_2O)_{0-100}(CH_2)_3O(CH_2CH(CH_3)O)$—$_{10-1000}(CH_2)_3O(Si(CH_3)_2O)_{0-1000}Si(CH_3)_2(CH_2)_3NHSi(CH_3)_2(CH_2)_3NH_2$, of which preference is given to
$HO(Si(CH_3)_2O)_{30-1000}Si(CH_3)_2(CH_2)_3NH_2$,
$HO(Si(CH_3)_2O)_{30-1000}Si(CH_3)_2(CH_2)_3NHSi(CH_3)_2(CH_2)_3NH_2$,
$(CH_3O)_2(CH_3)SiO(Si(CH_3)_2O)_{30-1000}Si(CH_3)_2(CH_2)_3NH_2$ and
$(CH_3O)_2(CH_3)SiO(Si(CH_3)_2O)_{30-1000}Si(CH_3)_2(CH_2)_3NHSi$—$(CH_3)_2(CH_2)_3NH_2$, and particular preference is given to $HO(Si(CH_3)_2O)$—$_{30-1000}Si(CH_3)_2(CH_2)_3NH_2$, and $(CH_3O)_2(CH_3)SiO(Si(CH_3)_2O)_{30-1000}Si(CH_3)_2(CH_2)_3NH_2$.

The polymers of the formula (I) used in accordance with the invention preferably have a viscosity of from $10^2$ to $10^8$ mPas, more preferably from 1000 to 350,000 mPas, in each case at 25° C.

The polymers of the formula (I) may be prepared by methods common in chemistry. For example, the polymers used in accordance with the invention may be prepared (a) by reacting cyclic silazanes of the formula (V)

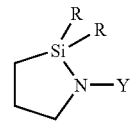

with polymers having Si-bonded hydroxyl groups, for example those of the formula (II), where R and Y each have one of the definitions specified above.

The inventive compositions preferably comprise polymer(s) of the formula (I) in amounts of from 10 to 90 parts by weight, more preferably from 10 to 50 parts by weight, and in particular from 10 to 25 parts by weight, based in each case on 100 parts by weight of crosslinkable composition.

Examples of $X^1$ radicals are the examples specified for the X radical. The $X^1$ radicals are preferably hydroxyl groups.

Examples of polymers of the formula (II) are dialkoxyalkylsilyl-terminated polydialkylsiloxanes, dialkoxyalkylsilyl-terminated polyalkylene glycols, dialkoxyalkylsilyl-terminated polyurethanes, dialkoxyalkylsilyl-terminated polyureas, dialkoxyalkylsilyl-terminated polyurea-polysiloxane copolymers, dialkoxyalkylsilyl-terminated polyisobutylenes and OH-terminated polydialkylsiloxanes, of which preference is given to dimethoxymethylsilyl-terminated polydimethylsiloxanes, dimethoxymethylsilyl-terminated polypropylene glycols and OH-terminated polydimethylsiloxanes, and particular preference is given to OH-terminated polydimethylsiloxanes.

The polymers of the formula (II) used in accordance with the invention preferably have a viscosity of from $10^2$ to $10^8$ mPas, more preferably from 1000 to 350,000 mPas, in each case at 25° C. The polymers of the formula (II) are commercial products or can be prepared by methods common in chemistry.

The inventive compositions preferably comprise polymer(s) of the formula (II) in amounts of from 10 to 90 parts by weight, more preferably from 30 to 90 parts by weight, and in particular from 30 to 70 parts by weight, based in each case on 100 parts by weight of crosslinkable composition.

Examples of $X^2$ radicals are the examples specified for the X radical. The $X^2$ radical is preferably an acyloxy radical or alkoxy radical, of which particular preference is given to the acetoxy, tert-butoxy, methoxy and ethoxy radicals.

Examples of $R^6$ radicals are the examples specified for the R radical. The $R^6$ radicals are preferably monovalent hydrocarbon radicals which have from 1 to 18 carbon atoms and are optionally substituted by halogen atoms, amino groups, ether groups, ester groups, epoxy groups, mercapto groups or cyano groups, more preferably hydrocarbon radicals having from 1 to 12 carbon atoms, in particular the methyl and the vinyl radicals.

Examples of silanes of the formula (III) are methyltriacetoxysilane, ethyltriacetoxysilane, n-propyltriacetoxysilane, diacetoxydi(tert-butoxy)silane, methyltrimethoxysilane, vinyltrimethoxysilane, methyltriethoxysilane, vinyltriethoxysilane, tetraethoxysilane, tetra-n-propoxysilane, tetraisopropoxysilane, methyltris(methylethylketoximo)silane, vinyltris(methylethylketoximo)silane, tetrakis(methylethylketoximo)silane, methyltris(methylisobutylketoximo)silane, vinyltris(methylisobutylketoximo)silane, and/or partial hydrolyzates thereof, of which particular preference is given to methyltrimethoxysilane and vinyltrimethoxysilane and/or their partial hydrolyzates.

The partial hydrolyzates of the silanes of the formula (III) used in accordance with the invention may be partial homohydrolyzates, i.e. partial hydrolyzates of one type of silane of the formula (III), or else partial cohydrolyzates, i.e. partial hydrolyzates of at least two different types of silanes of the formula (III). When the compound (c) optionally used in the inventive compositions comprises partial hydrolyzates of silanes of the formula (III), preference is given to those having from 4 to 20 silicon atoms.

The silanes of the formula (III) are commercial products or can be prepared by methods common in chemistry. The inventive compositions preferably comprise silanes of the formula (III) and/or partial hydrolyzates thereof in total amounts of from 0 to 15 parts by weight, more preferably from 0.5 to 5 parts by weight, and in particular from 2 to 5 parts by weight, based in each case on 100 parts by weight of crosslinkable composition.

Examples of $X^3$ radicals are the examples specified for the X radical. The $X^3$ radicals are preferably an alkoxy radical, of which the methoxy and ethoxy radical are particularly preferred.

Examples of $R^7$ radicals are the examples specified for the R radical. The $R^7$ radicals are preferably monovalent hydrocarbon radical which have from 1 to 18 carbon atoms and are optionally substituted by halogen atoms, amino groups, ether groups, ester groups, epoxy groups, mercapto groups or cyano groups, more preferably hydrocarbon radicals having from 1 to 12 carbon atoms, and in particular, the methyl radical.

Examples of $R^4$ radicals are the 3-aminopropyl, 3-(2-aminoethyl)aminopropyl, 3-glycidoxypropyl, 3-methacryloyloxypropyl, 3-mercaptopropyl, aminomethyl, N-cyclohexylaminomethyl, and N,N-diethylaminomethyl radicals. The $R^4$ radical is preferably an amino-substituted, monovalent, SiC-bonded hydrocarbon radical having from 1 to 20 carbon atoms, of which particular preference is given to those hydrocarbon radicals having 1 or 3 carbon atoms, in particular amino-substituted methyl and n-propyl radicals.

Examples of silanes of the formula (IV) are 3-aminopropyltrimethoxysilane, 3-aminopropyltriethoxysilane, 3-(2-aminoethyl)aminopropyltrimethoxysilane, 3-(2-aminoethyl)aminopropyltriethoxysilane, 3-(2-aminoethyl)aminopropylmethyldimethoxysilane, N-cyclohexyl-3-aminopropyltrimethoxysilane, N-cyclohexylaminomethyltriethoxysilane, N,N-diethylaminomethylmethyldimethoxysilane and/or partial hydrolyzates thereof, of which particular preference is given to 3-aminopropyltriethoxysilane, 3-(2-aminoethyl)aminopropyltriethoxysilane, N-cyclohexyl-3-aminopropyltrimethoxysilane, and N-cyclohexylaminomethyltriethoxysilane.

The partial hydrolyzates of the silanes of the formula (IV) used in accordance with the invention may be partial homohydrolyzates, i.e. partial hydrolyzates of one type of silane of the formula (IV), or else partial cohydrolyzates, i.e. partial hydrolyzates of at least two different types of silanes of the formula (IV). When the compound (d) optionally used in the inventive compositions comprises partial hydrolyzates of silanes of the formula (IV), preference is given to those having up to 20 silicon atoms.

The silanes of the formula (IV) are commercial products or can be prepared by methods common in chemistry. The inventive compositions preferably comprise silanes of the formula (IV) and/or partial hydrolyzates thereof in amounts of from 0 to 5 parts by weight, more preferably from 0.2 to 2 parts by weight, in particular from 0.5 to 1.5 parts by weight, based in each case on 100 parts by weight of crosslinkable composition.

In addition to the above-described components (a), (b), (c) and (d), the inventive compositions may further contain all substances which are conventionally used in compositions crosslinkable by condensation reaction, for example catalysts (e), plasticizers (f), fillers (g) and additives (h).

Examples of catalysts (e) are the known titanium compounds and organic tin compounds, such as di-n-butyltin dilaurate and di-n-butyltin diacetate, di-n-butyltin oxide, dioctyltin diacetate, dioctyltin dilaurate, dioctyltin oxide and reaction products of these compounds with alkoxysilanes such as tetraethoxysilane and complexes thereof with phosphorus compounds such as phosphoric esters or phosphonic acids, of which preference is given to di-n-butyltin diacetate and dibutyltin oxide in tetraethyl silicate hydrolyzate, and particular preference to the reaction product of di-n-butyltin oxide with tetraethyl silicate hydrolyzate and octylphosphonic acid.

If the inventive compositions comprise catalyst(s) (e), the amount is preferably from 0.01 to 3 parts by weight, preferably from 0.05 to 2 parts by weight, based in each case on 100 parts by weight of the crosslinkable composition.

Examples of plasticizers (f) are dimethylpolysiloxanes which are end-capped by trimethylsiloxy groups and are liquid at room temperature, in particular those having viscosities at 25° C. in the range of 5 and 1000 mPas, phthalic esters, citric esters and adipic esters, and also high-boiling hydrocarbons, for example paraffin oils or mineral oils consisting of naphthenic and paraffinic units.

The inventive compositions preferably comprise plasticizers (f) in amounts of from 0 to 50 parts by weight, more preferably from 10 to 30 parts by weight, and in particular from 15 to 25 parts by weight, based in each case on 100 parts by weight of the crosslinkable composition.

Examples of fillers (g) are nonreinforcing fillers, i.e. fillers having a BET surface area of up to 50 m$^2$/g, such as quartz, diatomaceous earth, calcium silicate, zirconium silicate, zeolites, metal oxide powders such as oxides or mixed oxides of aluminum, titanium, iron or zinc, barium sulfate, calcium carbonate, gypsum, silicon nitride, silicon carbide, boron nitride, glass and polymer powders, such as polyacrylonitrile powder; reinforcing fillers, i.e. fillers having a BET surface area of more than 50 m$^2$/g, such as pyrogenic silica, precipitated silica, precipitated chalk, carbon blacks such as furnace black and acetylene black, and silicon-aluminum mixed oxides of large BET surface area; fibrous fillers such as asbestos and polymer fibers. The fillers mentioned may be hydrophobicized, for example by the treatment with organosilanes or organosiloxanes or with stearic acid, or by etherification of hydroxyl groups to alkoxy groups. If fillers (g) are used, they are preferably hydrophilic pyrogenic silica and precipitated or ground calcium carbonate.

The inventive compositions preferably comprise fillers (g) in amounts of from 0 to 60 parts by weight, more preferably from 1 to 50 parts by weight, and in particular from 5 to 50 parts by weight, based in each case on 100 parts by weight of the crosslinkable composition.

Examples of additives (h) are pigments, dyes, odorants, oxidation inhibitors, agents for influencing the electrical properties such as conductive black, flame retardants, light stabilizers and agents for prolonging the skin formation time such as silanes having an SiC-bonded mercaptoalkyl radical, cell-generating agents, for example azodicarbonamide, heat stabilizers and thixotropic agents such as phosphoric esters, stabilizers such as polyglycols, and organic solvents such as alkylaromatics.

The inventive compositions comprise additives (h) in amounts of preferably from 0 to 100 parts by weight, more preferably from 0 to 30 parts by weight, and in particular from 0 to 10 parts by weight, based in each case on 100 parts by weight of the crosslinkable composition.

The inventive compositions are preferably those which consist of
(a) polymers of the formula (I),
(b) polymers of the formula (II),
(c) optionally, silanes of the formula (III),
(d) optionally, silanes of the formula (IV),
(e) optionally, catalyst(s),
(f) optionally, plasticizer(s),
(g) optionally, filler(s), and
(h) optionally, additive(s).

To prepare the inventive compositions, all constituents may be mixed with one another in any sequence. This mixing may be effected at room temperature and the pressure of the surrounding atmosphere, i.e. from about 900 to 1100 hPa. If desired, this mixing may also be effected at higher temperatures, for example at temperatures in the range of from 35° C. to 135° C. It is also possible for one or more of the components used to be prepared in situ.

The individual constituents of the inventive compositions may each be one type of such a constituent or else be a mixture of at least two different types of such constituents.

In a preferred process for preparing the inventive compositions, in a 1st stage, cyclic silazane of the formula (V) is reacted with an OH-terminated polydiorganosiloxane, and the ratios are selected such that up to 30%, preferably from 10 to 20%, of the OH groups on the OH-terminated polydiorganosiloxane can react with the cyclic silazane of the formula (V), and subsequently, in a 2nd stage, the further constituents (c) to (h) are added to complete the crosslinkable composition by known methods.

Stages 1 and 2 may be carried out technologically separately in different apparatus. For example, it is possible to meter in the desired amount of the cyclic silazane of the formula (V) directly after the preparation of the OH-terminated polydimethylsiloxane to form a mixture of polymers of the general formula (I) and of the general formula (II). Particular preference is given to carrying out steps 1 and 2 successively in the same mixer unit which serves to prepare the crosslinkable composition. It is not necessary to isolate the polymer (a) formed in the first stage before carrying out the 2nd stage.

The inventive compositions are preferably free-flowing or non-slumping and pasty at room temperature and the pressure of the surrounding atmosphere.

For the crosslinking of the inventive compositions, the typical water content of air is sufficient. The inventive compositions are preferably crosslinked at room temperature. Crosslinking can, if desired, also be carried out at temperatures higher or lower than room temperature, for example at from −5° to 15° C. or at from 30° to 50° C., and/or by means of concentrations of water exceeding the normal water content of air. Preference is given to carrying out the crosslinking at a pressure of from 100 to 1100 hPa, in particular at the pressure of the surrounding atmosphere.

The present invention further provides moldings produced by crosslinking the inventive compositions.

The inventive compositions may be used for all purposes for which compositions which are storable under the exclusion of water and crosslink to give elastomers at room temperature on ingress of water can be used. The inventive compositions are thus admirably suitable, for example, as sealants for joints, including vertical joints in the case of non-slumping compositions, and similar cavities having an internal diameter of, for example, from 10 to 40 mm, for example of buildings, land vehicles, watercraft and aircraft, or as adhesives or cementing compositions, for example in window construction or in the production of aquaria or glass cabinets and, for example, for the production of protective coatings, including those for surfaces exposed to the constant action of freshwater or seawater, or coatings preventing sliding, or elastomeric moldings or for the insulation of electrical or electronic devices.

The inventive compositions have the advantages that they can be prepared in a simple manner, that it is possible to start from readily available feedstocks, and that they are notable for a very high storage stability and a high crosslinking rate. In particular, the inventive crosslinkable compositions have the advantage that sealants having a low modulus can be prepared, the modulus being adjustable readily and within wide limits via the addition of an individual component, in particular via component(s) (a), without the application properties of the sealant, for example the expulsion rate, changing substantially.

In the examples described below, all viscosity data relates to a temperature of 25° C. Unless stated otherwise, the examples below are carried out at the pressure of the surrounding atmosphere, i.e. at about 1000 hPa, and at room temperature, i.e. at about 23° C., at a temperature which is established without additional heating or cooling when the reactants are combined at room temperature, and at a relative atmospheric humidity of about 50%. In addition, all parts and percentages, unless stated otherwise, are based on weight.

The Shore A hardness is determined in accordance with DIN (Deutsche Industrie Norm, German Industrial Standard) 53505 (August 2000 edition), while tensile strength, elongation at break and modulus (stress at 100% elongation) are determined in accordance with DIN 53504 (May 1994 edition) on specimens of the S2 form. The expulsion rate is determined on compositions transferred into commercial PE cartridges at a pressure of 2.5 bar and a die opening of 2 mm.

EXAMPLE 1

406 g of an α,ω-dihydroxypolydimethylsiloxane having a viscosity of 80,000 mPas, 182 g of a trimethylsilyl endcapped polydimethylsiloxane having a viscosity of 1000 mPas, and 1.6 g of 1,1-dimethyl-2-(3-aminopropyldimethylsilyl)-1-sila-2-azacyclopentane are mixed with one another in a planetary mixer and stirred for 60 minutes. Subsequently, 14 g of 3-(2-aminoethyl)aminopropyltriethoxysilane and 29.0 g of vinyltrimethoxysilane are added and the whole mixture is stirred for a further 15 minutes. Finally, the mixture is completed by homogeneously mixing in 1.1 g of octylphosphonic acid, 63 g of pyrogenic silica having a specific surface area of 150 m$^2$/g (commercially available under the HDK® V15 brand from Wacker-Chemie GmbH, Munich, Germany) and 0.8 g of a tin catalyst which is prepared by reacting 2.2 parts of di-n-butyltin diacetate and 4 parts of tetraethoxysilane. The thus obtained mixture is transferred into moisture-tight containers, and subsequently used to produce specimens by applying the composition as a 2 mm-thick layer to a substrate of polyethylene, and allowing it to crosslink at 50% relative atmospheric humidity and 23° C. for 7 days. Subsequently, test specimens of the S2 form to DIN 53504 are stamped out of these plaques. The test specimens are analyzed with regard to their mechanical characteristics. In addition, the expulsion rate is determined on the uncrosslinked composition. The results can be found in table 1.

EXAMPLE 2

The procedure described in example 1 is repeated with the difference that instead of 1.6 g of 1,1-dimethyl-2-(3-aminopropyldimethylsilyl)-1-sila-2-azacyclopentane, 2.2 g of 1,1-dimethyl-2-(3-aminopropyldimethylsilyl)-1-sila-2-azacyclopentane are used. The results can be found in Table 1.

EXAMPLE 3

The procedure described in example 1 is repeated with the difference that instead of 1.6 g of 1,1-dimethyl-2-(3-aminopropyldimethylsilyl)-1-sila-2-azacyclopentane, 2.8 g of 1,1-dimethyl-2-(3-aminopropyldimethylsilyl)-1-sila-2-azacyclopentane are used. The results can be found in Table 1.

TABLE 1

| Example | Expulsion rate [g/min] | Shore A hardness | Modulus [N/mm$^2$] | Tensile strength [N/mm$^2$] | Elongation at break [%] |
|---|---|---|---|---|---|
| 1 | 16.2 | 17 | 0.31 | 1.1 | 530 |
| 2 | 20.4 | 14 | 0.28 | 1.0 | 580 |
| 3 | 19.8 | 11 | 0.22 | 0.7 | 640 |

EXAMPLE 4

535 g of an α,ω-dihydroxypolydimethylsiloxane having a viscosity of 80,000 mPas and 2.2 g of 1,1-dimethyl-2-(3-aminopropyldimethylsilyl)-1-sila-2-azacyclopentane are mixed with one another in a planetary mixer and stirred for 60 minutes. Subsequently, 9 g of 3-(2-aminoethyl)aminopropyltriethoxysilane and 37.3 g of vinyltrimethoxysilane are added and the whole mixture is stirred for a further 15 minutes. Finally, the composition is completed by homogeneously mixing in 1.4 g of octylphosphonic acid, 54 g of pyrogenic silica having a specific surface area of 150 m$^2$/g (commercially available under the HDK® V15 brand from Wacker-Chemie GmbH, Munich, Germany), 270 g of ground calcium carbonate (commercially available under the name "OMYA BLP 2" from Omya GmbH, Cologne, Germany) and 2.7 g of a tin catalyst which is prepared by reacting 2.2 parts of di-n-butyltin diacetate and 4 parts of tetraethoxysilane. The thus obtained mixture is transferred into moisture-tight containers, and subsequently cured and tested as specified in example 1. The results can be found in table 2.

EXAMPLE 5

The procedure described in example 4 is repeated with the difference that instead of 2.2 g of 1,1-dimethyl-2-(3-aminopropyldimethylsilyl)-1-sila-2-azacyclopentane, 2.9 g of 1,1-dimethyl-2-(3-aminopropyldimethylsilyl)-1-sila-2-azacyclopentane are used. The results can be found in Table 2.

EXAMPLE 6

The procedure described in example 4 is repeated with the difference that instead of 2.2 g of 1,1-dimethyl-2-(3-aminopropyldimethylsilyl)-1-sila-2-azacyclopentane, 3.6 g of 1,1-dimethyl-2-(3-aminopropyldimethylsilyl)-1-sila-2-azacyclopentane are used. The results can be found in Table 2.

TABLE 2

| Example | Expulsion rate [g/min] | Shore A hardness | Modulus [N/mm$^2$] | Tensile strength [N/mm$^2$] | Elongation at break [%] |
|---|---|---|---|---|---|
| 4 | 14.4 | 31 | 0.58 | 1.8 | 420 |
| 5 | 15.0 | 24 | 0.47 | 1.5 | 470 |
| 6 | 13.8 | 17 | 0.36 | 1.1 | 520 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A condensation crosslinkable composition based on organosilicon compounds, comprising
    (a) at least one polymer of the formula $$X_nR_{3-n}Si\text{-}A\text{-}SiR_2\text{—}(CH_2)_3NHY \quad (I)$$

where
    n is 1 or 2,
    X each is the same or different and is a hydroxyl radical or hydrolyzable radical,
    R each is the same or different and is a monovalent, optionally substituted hydrocarbon radical,
    Y each is the same or different and is a hydrogen atom or a —Si(CH$_3$)$_2$(CH$_2$)$_3$NH$_2$ radical, and
    A each is the same or different and is a divalent organic or organosilicon radical,
    (b) at least one polymer of the structure $$X^1_kR^5_{3-k}Si\text{-}A^1\text{-}SiX^1_kR^5_{3-k} \quad (II)$$

where
    k each is the same or different and is 1 or 2,
    R$^5$ each is the same or different and has the definition specified for R,
    A$^1$ each is the same or different and has the definition specified for A, and
    X$^1$ each is the same or different and has the definition specified for X,
    (c) one or more silanes of the formula $$R^6_mSiX^2_{4-m} \quad (III)$$

and/or partial hydrolyzates thereof, where
    m is 0 or 1,
    R$^6$ each is the same or different and has the definition specified for R and
    X$^2$ each is the same or different and has the definition specified for X, and
    (d) optionally, one or more silanes of the formula $$R^4_oSiR^7_pX^3_{4-o-p} \quad (IV)$$

and/or partial hydrolyzates thereof, where
    p is 0 or 1,
    o is 1 or 2,
    R$^7$ each is the same or different and has the definition specified for R, $X^3$ each is the same or different and has the definition specified for X, and $R^4$ each is the same or different and is a monovalent, SiC-bonded hydrocarbon radical substituted by nitrogen, oxygen, sulfur and/or halogen, with the proviso that the sum of o+p is less than 3.

2. The crosslinkable composition of claim 1, wherein the A radical comprises a divalent polyether radical or divalent polydiorganosiloxane radical.

3. The crosslinkable composition of claim 1, wherein the $A^1$ radical comprises a divalent polyether radical or divalent polydiorganosiloxane radical.

4. The crosslinkable composition of claim 1, which contains polymer(s) of the formula (I) in amounts of from 10 to 90 parts by weight, based on 100 parts by weight of crosslinkable composition.

5. The crosslinkable composition of claim 1, which contains polymer(s) of the formula (II) in amounts of from 10 to 90 parts by weight, based on 100 parts by weight of crosslinkable composition.

6. The crosslinkable composition of claim 1, which comprises:
   (a) polymer(s) of the formula (I),
   (b) polymer(s) of the formula (II),
   (c) silane(s) of the formula (III),
   (d) optionally, silane(s) of the formula (IV),
   (e) optionally, condensation catalyst(s),
   (f) optionally, plasticizer(s),
   (g) optionally, filler(s) and
   (h) optionally, further additives different from components (a) through (g).

7. A molding produced by crosslinking the composition of claim 1.

8. The molding of claim 7 which is a sealant.

9. The composition of claim 1, wherein the polymers of the formula (I) have a viscosity of from 1000 to 350,000 mPas at 25° C., and the polymers of the formula (II) have a viscosity of 1000 to 350,000 mPas at 25° C.

10. The composition of claim 1 which is a moisture-curable composition.

11. A process for preparing a condensation crosslinkable composition, comprising
   (a) at least one polymer of the formula

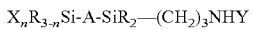  (I)

$X_nR_{3-n}Si\text{-}A\text{-}SiR_2\text{---}(CH_2)_3NHY$ where
   n is 1 or 2,
   X each is the same or different and is a hydroxyl radical or hydrolyzable radical,
   R each is the same or different and is a monovalent, optionally substituted hydrocarbon radical,
   Y each is the same or different and is a hydrogen atom or a —Si(CH$_3$)$_2$(CH$_2$)$_3$NH$_2$ radical, and
   A each is the same or different and is a divalent organic or organosilicon radical,
   (b) at least one polymer of the structure $X^1{}_kR^5{}_{3-k}Si\text{-}A^1\text{-}SiX^1{}_kR^5{}_{3-k}$  (II)

where
   k each is the same or different and is 1 or 2,
   $R^5$ each is the same or different and has the definition specified for R,
   $A^1$ each is the same or different and has the definition specified for A, and
   $X^1$ each is the same or different and has the definition specified for X, said process comprising:
   in a 1st stage, reacting at least one cyclic silazane of the formula (V)

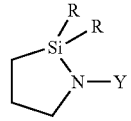

with OH-terminated polydiorganosiloxane(s), wherein the ratio of cyclic silazane(s) and OH-terminated polydiorganosiloxane(s) is selected such that up to 30% of the OH groups on the OH-terminated polydiorganosiloxane can react with the cyclic silazane of the formula (V), and subsequently,
   in a 2nd stage, adding one or more further constituents (c) silane(s) of formula (III), (d) silane(s) of the formula (IV), (e) catalyst(s), (f) plasticizer(s), (g) filler(s), and (h) other additives different from (a) to (g) to (h) to complete the crosslinkable compositions,
   wherein the silanes of the formula (III) are silanes of the formula $R^6{}_mSiX^2{}_{4-m}$  (III)

and/or partial hydrolyzates thereof, where
   m is 0 or 1,
   $R^6$ each is the same or different and has the definition specified for R and
   $X^2$ each is the same or different and has the definition specified for X, and
   wherein the silanes of the formula (IV) are silanes of the formula $R^4{}_oSiR^7{}_pX^3{}_{4-o-p}$  (IV)

and/or partial hydrolyzates thereof, where
   p is 0 or 1,
   o is 1 or 2,
   $R^7$ each is the same or different and has the definition specified for R,
   $X^3$ each is the same or different and has the definition specified for X, and
   $R^4$ each is the same or different and is a monovalent, SiC-bonded hydrocarbon radical substituted by nitrogen, oxygen, sulfur and/or halogen, with the proviso that the sum of o+p is less than 3.

12. The process of claim 11, wherein the A radical comprises a divalent polyether radical or divalent polydiorganosiloxane radical.

13. The process of claim 11, wherein the $A^1$ radical comprises a divalent polyether radical or divalent polydiorganosiloxane radical.

14. The process of claim 11, wherein the crosslinkable composition contains polymer(s) of the formula (I) in amounts of from 10 to 90 parts by weight, based on 100 parts by weight of crosslinkable composition.

15. The process of claim 11, wherein the crosslinkable composition contains polymer(s) of the formula (II) in amounts of from 10 to 90 parts by weight, based on 100 parts by weight of crosslinkable composition.

16. The process of claim 11, wherein the crosslinkable composition comprises:
   (a) polymer(s) of the formula (I),
   (b) polymer(s) of the formula (II),
   (c) optionally, silane(s) of the formula (III),
   (d) optionally, silane(s) of the formula (IV),
   (e) optionally, condensation catalyst(s), (f) optionally, plasticizer(s), (g) optionally, filler(s) and (h) optionally, further additives different from components (a) through (g).

17. A molding produced by crosslinking a composition prepared by the process of claim 11.

18. The molding of claim 17 which is a sealant.

* * * * *